3,095,383
ETHYLENE POLYMERIZATION CATALYST PREPARED BY GRINDING TITANIUM AND IODINE
Gaetano F. D'Alelio, South Bend, Ind., assignor, by mesne assignments, to W. R. Grace & Co., New York, N.Y., a corporation of Connecticut
No Drawing. Filed Nov. 6, 1957, Ser. No. 694,729
4 Claims. (Cl. 252—441)

This invention pertains to a novel synthesis of ethylene polymers.

Summarily, my invention comprises polymerizing ethylene in an inert solvent at superatmospheric pressure in the presence of a catalyst prepared by grinding a mixture comprising Ti metal and iodine under inert conditions.

The following examples illustrate without limiting the invention.

Example 1

Three grams of Ti powder and 0.2 gram of $I_2$ are wet ground in 15 ml. toluene in an atmosphere of pure dry nitrogen for 7 days in a conventional stainless steel ball mill of 4 ounce capacity loaded to approximately one-half its bulk volume with ½ inch stainless steel balls. The charge is washed through a ¼ inch stainless steel screen into a 200 cc. stainless steel bomb with an additional 50 ml. of toluene. The transfer is made in a dry box maintained under a slight pressure of nitrogen to avoid contamination with moisture, oxygen, and the like. Since the catalyst is extremely pyrophoric and sensitive to such contaminants, it therefore should always be handled under inert conditions. The bomb is closed, pressurized with ethylene to about 500 p.s.i., and heated to a temperature of about 100° C. During the polymerization reaction, repressurizing with ethylene is necessary, to maintain the aforesaid pressure. After 12 hours of polymerization reaction is terminated. The bomb is cooled and vented and upon opening a yield of 5 grams high density polyethylene is obtained.

Example 2

Using the same equipment as in Example 1 five grams of Ti and 0.5 gram $I_2$ are dry ground in an $N_2$ atmosphere for 10 days. The contents of the mill are discharged along with 50 ml. toluene added after milling to wash the mill charge into a 200 cc. stainless steel bomb, through a ¼ inch stainless steel screen located in a dry box. The function of the dry box is the same as that set forth in the prior example. In these examples I have used nitrogen to maintain an inert atmosphere in the grinding and transfer steps; however, any inert gas, e.g., the noble gases, can be used to obtain the same result. The bomb is sealed, heated to a temperature of about 125° C. and pressured with ethylene to about 500 p.s.i. This pressure is maintained by repressurizing with ethylene throughout the polymerization. After 18 hours the polymerization reaction is terminated and the bomb is cooled and vented. A good yield of high density polyethylene after purification by boiling in methanol containing HCl is obtained.

The catalyst as above prepared is useful in polymerizing ethylene at temperatures ranging from about room temperature up to about 200° C., and even higher, and at pressures ranging from a few atmospheres, for example 100 p.s.i., to pressures as high as 10,000 p.s.i., and even higher. For practical operation, however, temperatures in the range of 50–200° C., and pressures of 150–1000 p.s.i. are suitable.

Ethylene polymerization is ordinarily performed in 2–48 hours. However longer periods, e.g., 4 days or more, may be utilized. Generally, if sufficient activated catalyst is present, a longer polymerization period will result in greater polymer yields.

The polymerization reaction is suitably carried out in an inert solvent. Hydrocarbon solvents free from contaminants (especially free from oxygen and oxygen-containing compounds) are preferred. Among the suitable solvents are pentane, hexane, heptane, cyclohexane, octane, benzene, xylene, toluene, and the like.

The amount of catalyst is not critical. Relatively small amounts are operable to form relatively large amounts of polymer. In general, a practical range is 0.001 to 1 g. of catalyst per gram of ethylene polymerized. Even larger amounts are operable, but not necessary.

In conducting the ball milling operation it is often convenient to wet grind. For example, a hydrocarbon may be added to the mixture to be ball milled. The hydrocarbon if used is preferably one that will not interfere with the subsequent polymerization reaction. Solvents suitable for use in the polymerization reaction as above described are in general suitable for "wet" ball milling. The aromatic hydrocarbons are the preferred solvents. The use of such a hydrocarbon in the ball milling step provides a slurry of the catalyst in an inert medium which is easily handled. If the mixture is dry ground it should be done under an inert atmosphere such as pure dry nitrogen or a noble gas. If desired the mixture can be dry ground under an inert atmosphere of nitrogen or the like, and then the milled mixture can be flushed from the mill with an inert hydrocarbon. Similarly, the milling can be carried out partly by dry grinding in an inert atmosphere and then an inert hydrocarbon can be added to the mill toward the end of the milling in order to slurry the product for ease of handling.

Any grinding or milling whatever of a mixture consisting essentially of Ti and iodine will provide a catalyst of some activity. Preferably, however, the milling or grinding should be conducted for a number of hours, and suitably for at least 1 day. The Ti:$I_2$ weight ratio can vary considerably, e.g., from 1 Ti:100 $I_2$ to 100 Ti:1 $I_2$. The Ti can be charged to the mill as pieces, granules, flakes, powder, or the like.

The polyethylene obtained by practice of this invention can be used in any conventional manner now being used by polyethylenes formed by prior art procedures. Such uses include film, molding, pipe, tubing, filament, extruded articles and the like.

I claim:

1. The method of preparing a catalyst that includes the step of grinding under inert conditions a mixture consisting essentially of Ti and iodine in a weight ratio of 1 Ti:100 $I_2$ to 100 Ti:1 $I_2$.

2. The method according to claim 1 in which the mixture is ball-milled for at least one day.

3. The method according to claim 1 in which the grinding is done in an inert atmosphere.

4. The method according to claim 1 in which the grinding is done in an inert hydrocarbon liquid.

(References on following page)

References Cited in the file of this patent

UNITED STATES PATENTS

| | | |
|---|---|---|
| 2,827,447 | Nowlin et al. | Mar. 18, 1958 |
| 2,893,984 | Seebach et al. | July 7, 1959 |
| 2,899,416 | Schreyer | Aug. 11, 1959 |

FOREIGN PATENTS

| | | |
|---|---|---|
| 534,792 | Belgium | Jan. 31, 1955 |
| 538,782 | Belgium | Dec. 6, 1955 |
| 1,132,506 | France | Nov. 5, 1956 |
| 1,134,740 | France | Dec. 3, 1956 |
| 778,639 | Great Britain | July 10, 1957 |

OTHER REFERENCES

Comp. Treatise Inorg. and Theo. Chem. (Mellor), published by Longmans, Green and Co., vol. 7, 1927 (N.Y.), page 89.